United States Patent [19]

Boyesen

[11] Patent Number: 4,621,706

[45] Date of Patent: Nov. 11, 1986

[54] MOTORCYCLE DRIVE WHEEL SUSPENSION SYSTEM

[75] Inventor: Eyvind Boyesen, Kempton, Pa.

[73] Assignee: Performance Industries, Inc., Kempton, Pa.

[21] Appl. No.: 808,643

[22] Filed: Dec. 13, 1985

Related U.S. Application Data

[63] Continuation-in-part of Ser. No. 577,026, Feb. 6, 1984, Pat. No. 4,558,761, which is a continuation-in-part of Ser. No. 544,091, Oct. 21, 1983, Pat. No. 4,544,044, which is a continuation-in-part of Ser. No. 513,311, Jul. 13, 1983, abandoned, which is a continuation-in-part of Ser. No. 368,220, Apr. 14, 1982, Pat. No. 4,408,674.

[51] Int. Cl.$^4$ .............................................. B60K 25/04
[52] U.S. Cl. ..................................... 180/227; 280/284; 267/15 R
[58] Field of Search .............. 180/227, 219; 280/284, 280/285; 267/15 R, 15 A

[56] References Cited

U.S. PATENT DOCUMENTS

| | | | |
|---|---|---|---|
| 2,705,154 | 3/1955 | Torre | 180/227 |
| 3,819,002 | 6/1974 | Heathwaite | 180/227 |
| 3,917,313 | 11/1975 | Smith et al. | 280/284 |
| 4,034,821 | 7/1977 | Stoddard | 180/227 |
| 4,058,181 | 11/1977 | Buell | 180/227 |
| 4,076,271 | 2/1978 | Doncque | 280/284 |
| 4,114,918 | 9/1978 | Lutz | 280/284 |
| 4,265,329 | 5/1981 | DeCortanze | 180/219 |
| 4,265,330 | 5/1981 | Silk et al. | 180/219 |
| 4,392,536 | 7/1983 | Iwai et al. | 180/217 |

FOREIGN PATENT DOCUMENTS

| | | | |
|---|---|---|---|
| 847109 | 6/1952 | Fed. Rep. of Germany | 280/285 |
| 846372 | 7/1981 | U.S.S.R. | 180/231 |

Primary Examiner—John A. Pekar
Attorney, Agent, or Firm—Kenneth P. Synnestvedt

[57] ABSTRACT

A suspension system for the drive wheel of a motorcycle driven by a chain cooperating with sprockets on the engine and wheel shafts. The suspension system comprises a linkage arrangement associated with the swing arm, with the linkage parts positioned in the region between the wheel and the motor, with the swing arm substantially in a plane containing the axes of the engine and wheel sprockets, and with linkage components defining or approximating a parallelogram configuration.

5 Claims, 32 Drawing Figures

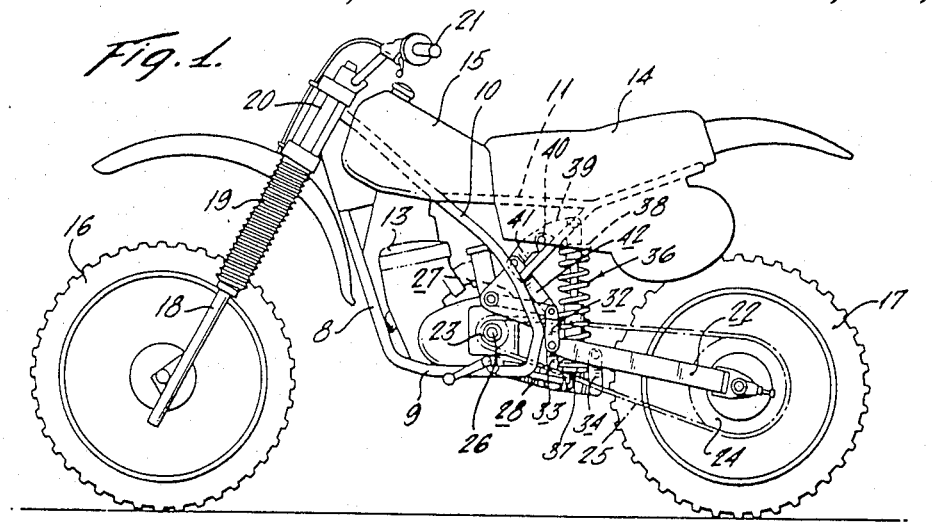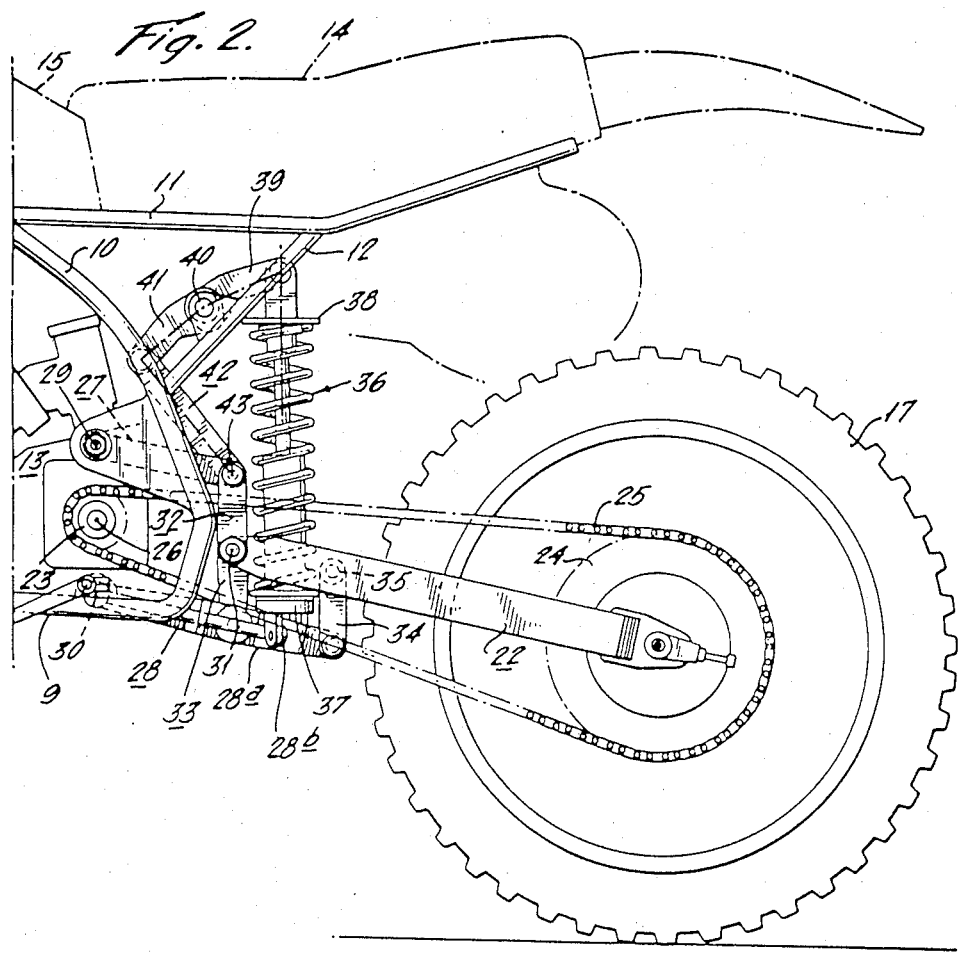

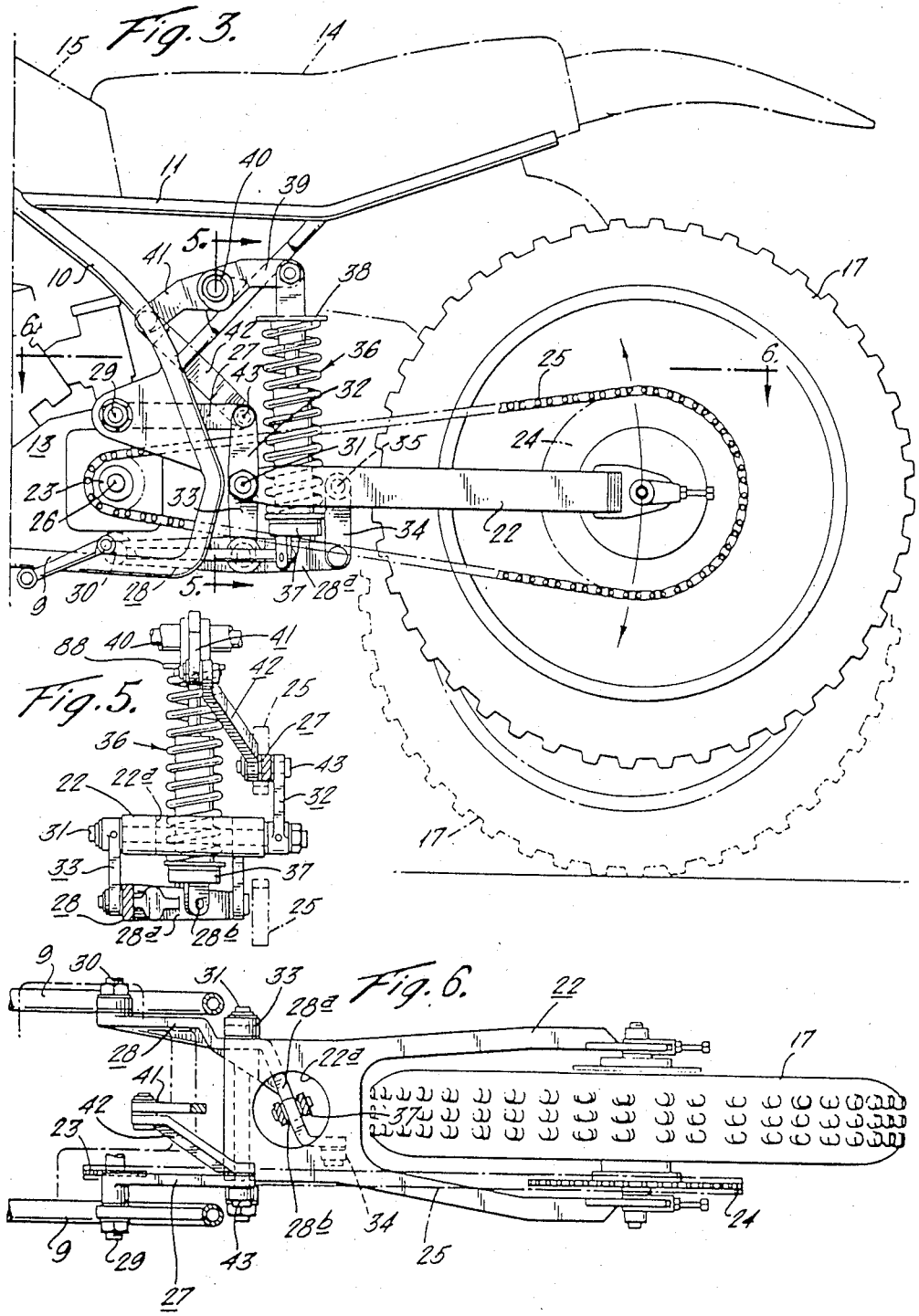

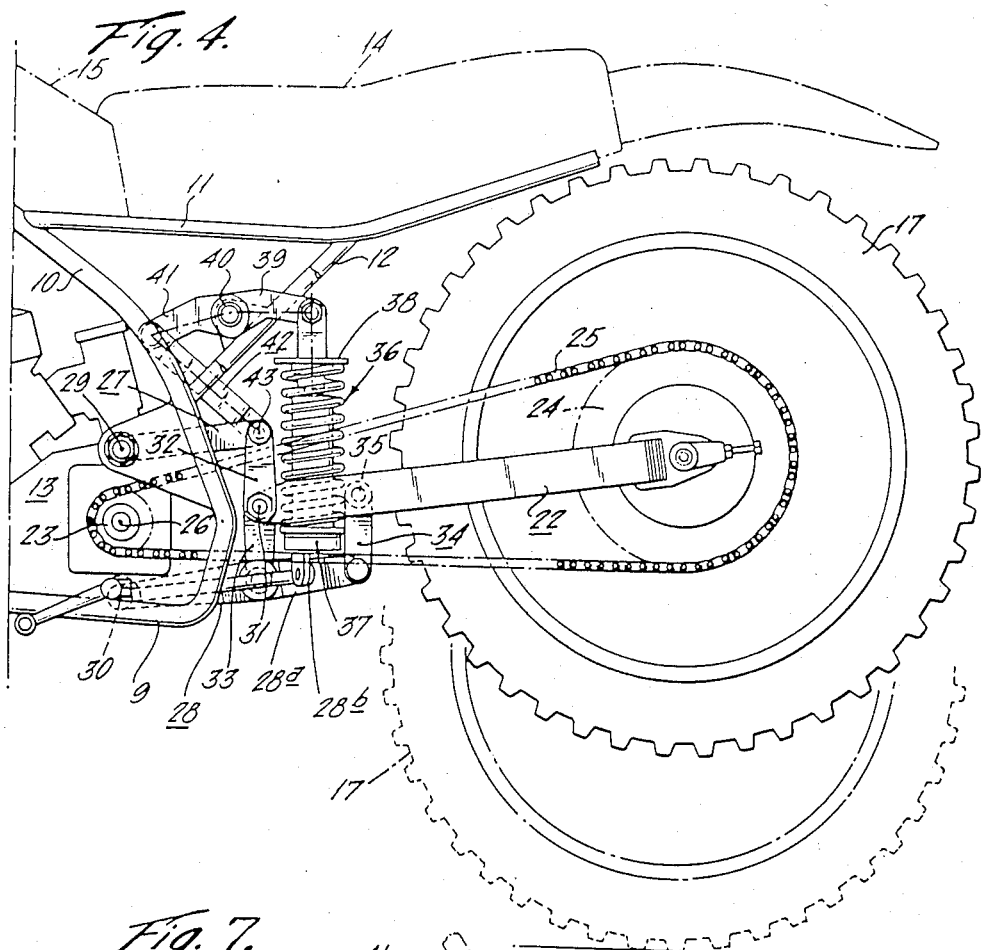

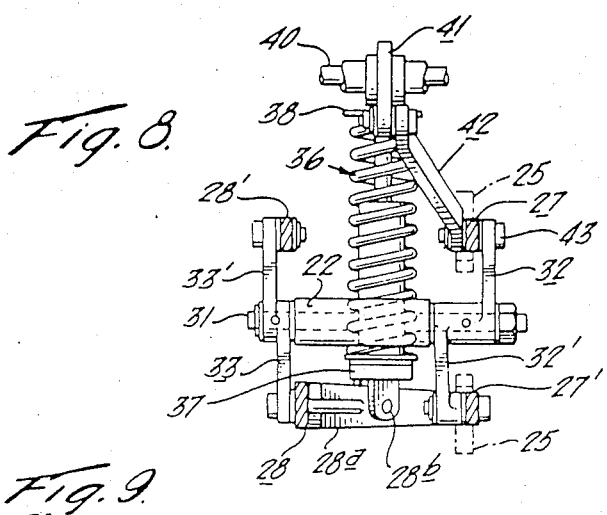

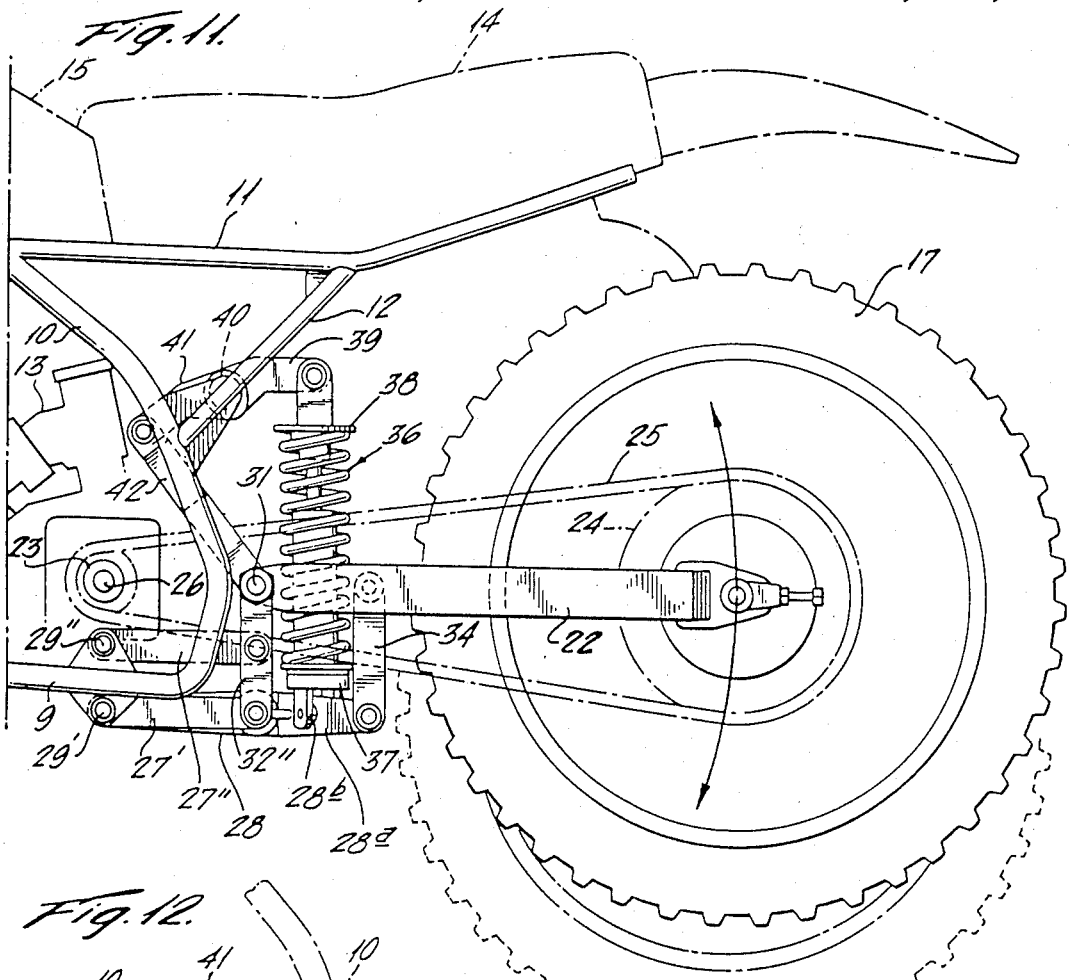
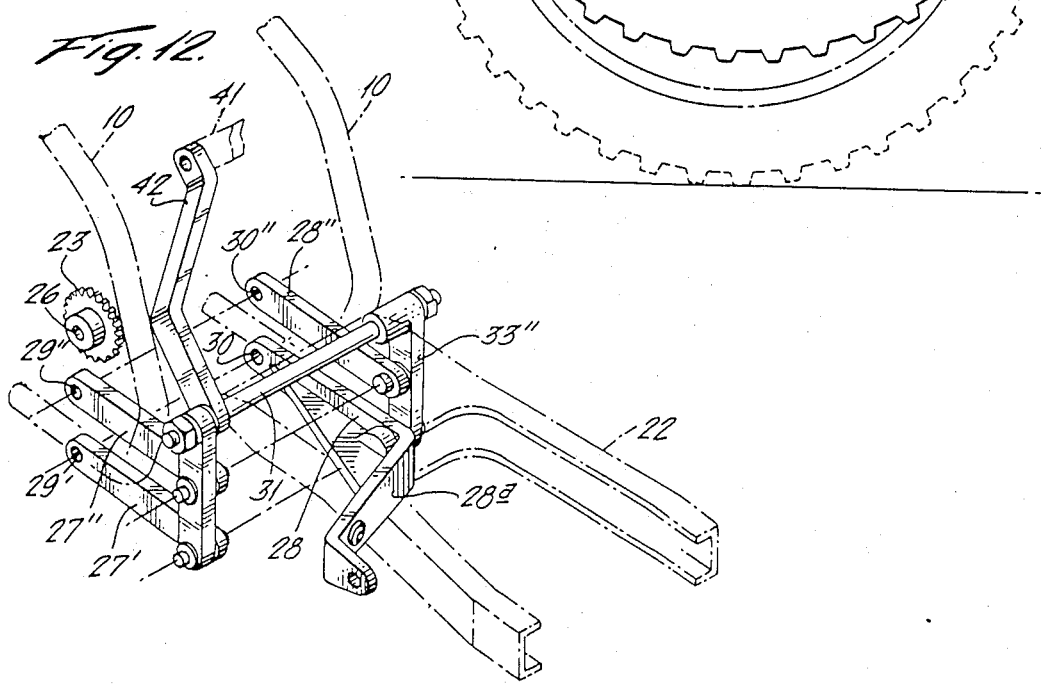

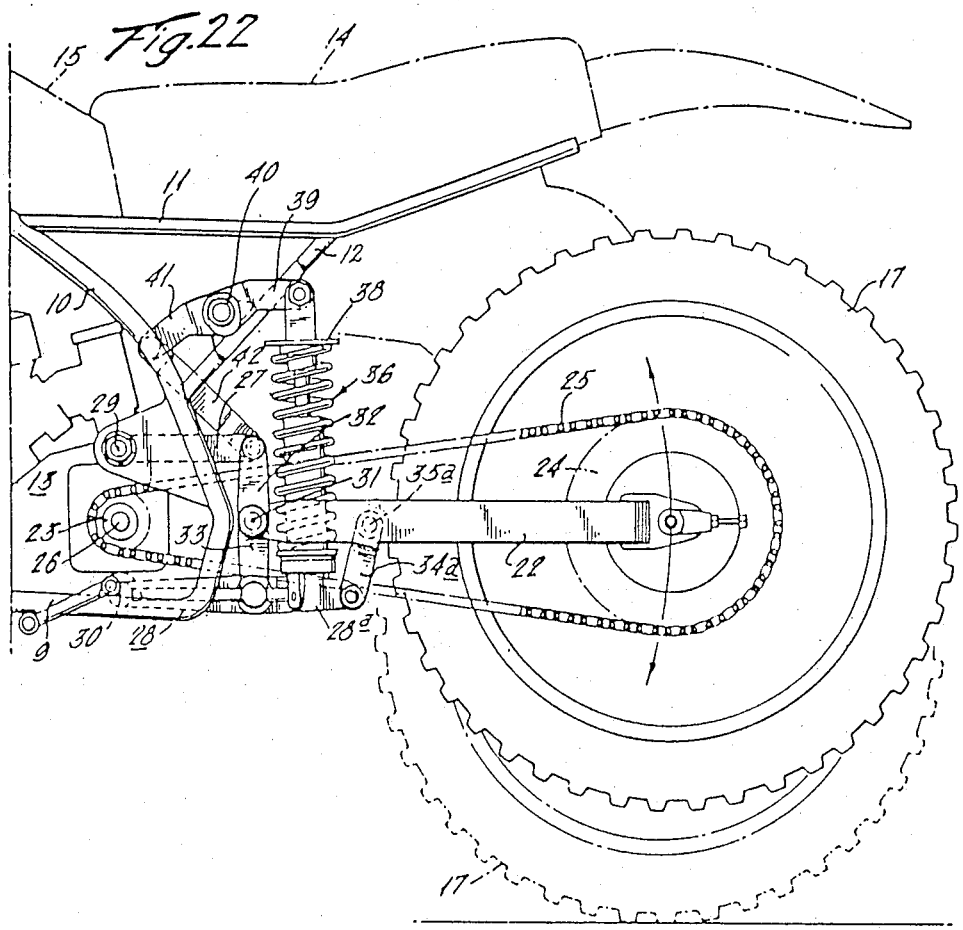
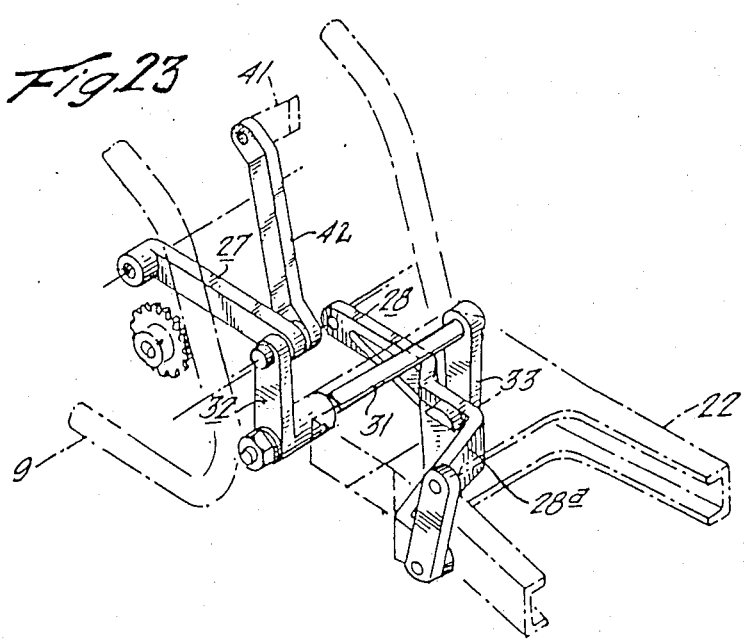

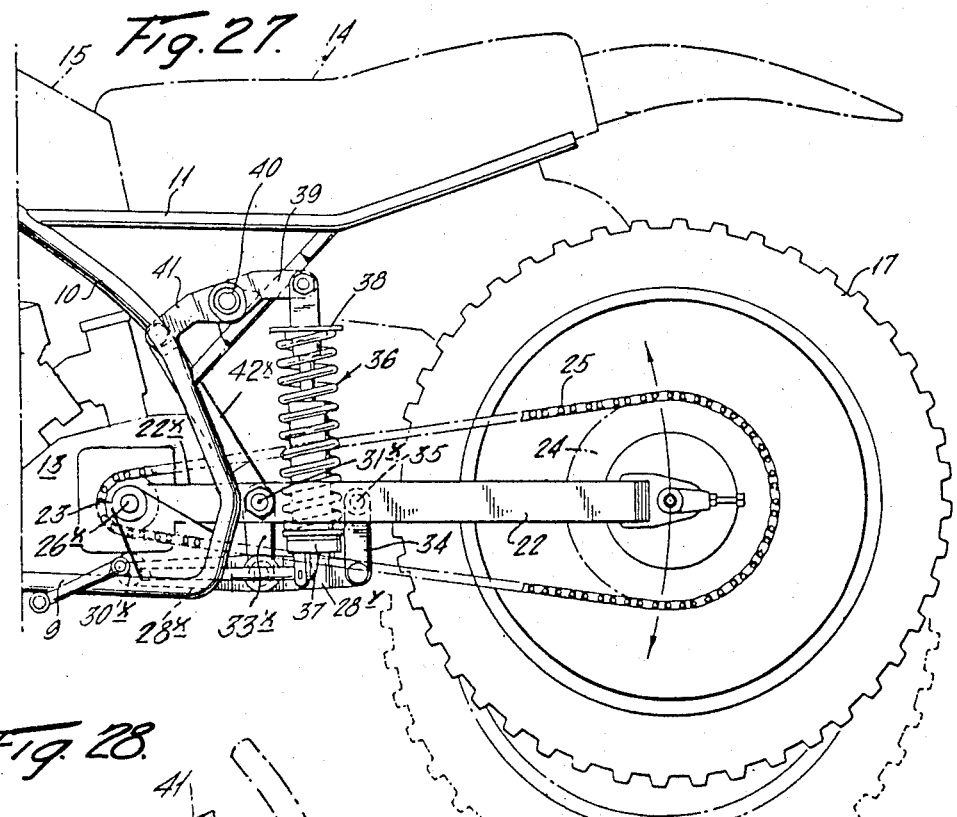
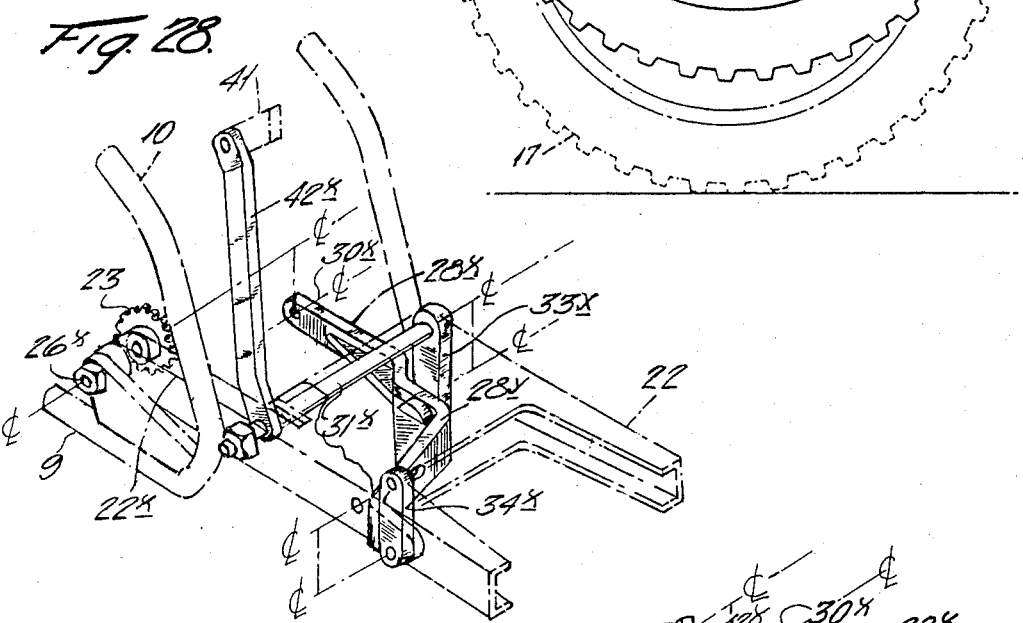
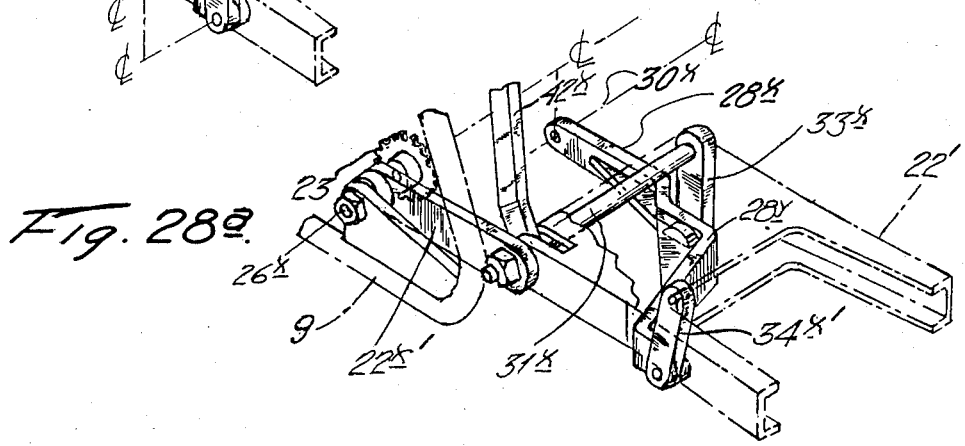

MOTORCYCLE DRIVE WHEEL SUSPENSION SYSTEM

CROSS REFERENCE

The present application is a continuation-in-part of my application Ser. No. 577,026, filed Feb. 6, 1984, to be issued as U.S. Pat. No. 4,558,761 on Dec. 17, 1985, which is a continuation-in-part of my application Ser. No. 544,091, filed October 21, 1983, issued as U.S. Pat. No. 4,544,044 on Oct. 1, 1985, which is a continuation-in-part of my application Ser. No. 513,311, filed July 13, 1983, now abandoned, which is a continuation-in-part of my application Ser. No. 368,220, filed Apr. 14, 1982, issued as U.S. Pat. No. 4,408,674 on Oct. 11, 1983.

BACKGROUND AND STATEMENT OF OBJECTS

This invention relates to a drive wheel suspension system for a motorcycle of the kind in which the drive wheel is driven by a chain cooperating with sprockets provided on the engine shaft and on the wheel shaft. In such motorcycles, it has been common practice to employ a swing arm for mounting the wheel, the swing arm having a pivot usually located in the region between the engine sprocket and the periphery of the driven wheel. With this configuration, the motion of the swing arm, which accompanies deflection of the wheel, results in change in the length of the path to be followed by the drive chain interconnecting the engine and wheel sprockets; and a chain slack take up device is commonly employed in order to maintain proper driving engagement of the chain with the sprockets. In addition, with this prior arrangement, certain undesirable forces are present in the motorcycle, especially during acceleration and braking. One such undesirable force is commonly referred to as "squat", i.e., a force tending to cause the rider's seat to deflect downwardly during acceleration.

It has also been known (see for example U.S. Pat. No. 4,058,181) to provide a parallelogram type of swing arm suspension arrangement for mounting the drive wheel, this arrangement, in effect, comprising multiple swing arms located above and below the axes of the driving sprockets, the multiple swing arms being interconnected and arranged to provide for pivotal motion of the drive wheel about the axis of the engine sprocket, thereby eliminating the change in the length of the chain path. Although this makes possible elimination of the chain slack take up device, the prior art arrangement has a number of disadvantages, notably the fact that the multiple swing arm elements used for the parallelogram arrangement of said prior patent extensively increase the mass of the parts which must move with the wheel. Moreover, with the multiple swing arms located above and below the axes of the sprockets, certain undesirable forces during acceleration and braking are still present in the overall structure of the motorcycle, and, in fact, are even exaggerated.

According to the present invention, provision is made for a parallelogram linkage adapted to be associated with the inner or pivoted end of the swing arm preferably in a region between the periphery of the wheel and the axis of the engine sprocket, but arranged to provide an effective swing arm axis which is coincident with the axis of the engine sprocket. By locating the linkage parts in the region between the periphery of the wheel and the axis of the engine sprocket, the weight of the parts involved is concentrated relatively close to the effective axis of swing motion. This greatly reduces the overall weight of the parts and also reduces the inertia of the parts moving with the wheel and, consequently, improves the responsiveness of the wheel under various operating conditions including, for example, travel over rough terrain such as is commonly encountered in motocross racing. Still further, the arrangement of the invention provides for use of a swing arm structure lying substantially in a plane containing the axes of the driving and driven sprockets, and this reduces certain of the undesirable forces which tend to occur especially during acceleration.

The invention also contemplates association of the deflection resisting mechanism, such as a typical shock absorbing or shock strut device, with the parallelogram linkage parts located close to the effective swing motion axis, these parts being arranged to provide a reaction point on the frame of the motorcycle which is relatively close to the overall center of gravity of the motorcycle, thereby minimizing tendency for the action of the shock strut to cause the attitude of the motorcycle as a whole to change in consequence of substantial wheel deflection.

The invention also provides several alternative parallelogram suspension arrangements having the advantages hereinabove mentioned, but still further providing additional advantages. In one such alternative embodiment, multiple levers and links are employed in order to increase the overall strength of the linkage. In another aspect of the alternative embodiments, provision is made for alternative location of certain of the parts of the linkage mechanism, thereby readily adapting the parallelogram arrangement of the invention to motorcycles of different construction, as will be explained hereinafter.

Still further, with linkage and swing arm arrangements of the kind herein disclosed, various of the advantages above referred to may be attained, even when certain of the linkage elements do not precisely define a parallelogram linkage. In view of this, greater flexibility is provided with respect to the location of the linkage parts on the motorcycle frame.

According to some of the embodiments of the invention certain of the suspension linkage elements are positioned at somewhat oblique angles with respect to other linkage elements, thereby providing for reducing the forces which tend to induce "squat" when accelleration occurs.

BRIEF DESCRIPTION OF THE DRAWINGS

How the foregoing and other objects and advantages are attained will be clear from the following description referring to the accompanying drawings, which illustrate various different structural embodiments, and also several diagrammatic alternatives for certain of the parts.

FIGS. 1 to 7 show one structural embodimen

FIG. 1 is an overall side elevational view of a motorcycle equipped with one form of the drive wheel suspension of the present invention;

FIG. 2 is a enlarged view of the embodiment of FIG. 1, showing the rear portion of the motorcycle including the driving wheel, with the wheel positioned in the normal or static load supporting position;

FIG. 3 is a view similar to FIG. 2 but illustrating the wheel in partially deflected position;

FIG. 4 is a view similar to FIGS. 2 and 3 but illustrating the wheel in an upper deflected position near the top of the stroke;

FIG. 5 is a partial vertical sectional view of the embodiment of FIGS. 1 to 7, with certain parts, shown as indicated by the section line 5—5 on FIG. 3;

FIG. 6 is a plan view of certain parts taken in general in the manner indicated by the line 6—6 on FIG. 3; and FIG. 7 is a perspectve view of some of the linkage parts associated with the swing arm, these parts being arranged in the manner provided by the present invention.

FIGS. 8, 9 and 10 show a second structural embodiment:

FIG. 8 is a view similar to FIG. 5 but illustrating the second embodiment;

FIG. 9 is a view similar to FIG. 6; and

FIG. 10 is a perspective view similar to FIG. 7 but illustrating the second embodiment.

FIGS. 11 and 12 show a third structural embodiment:

FIG. 11 is a view similar to FIG. 3 but illustrating the third embodiment; and

FIG. 12 is a perspective view similar to FIGS. 7 and 10 but illustrating the third embodiment.

FIGS. 13, 14 and 15 diagrammatically illustrate three different positions of an alternative embodiment;

FIGS. 16, 17 and 18 diagrammatically illustrate three different positions oF another alternative embodiment; and FIGS. 19, 20 and 21 illustrate still another alternative embodiment.

FIG. 22–26 illustrate another alternative pivot location:

FIG. 22 is a view similar to FIG. 3 but illustrating an alternative arrangement of one of the links of the suspension mechanism;

FIG. 23 is a perspective view similar to FIG. 7, but showing the alternative arrangement of FIG. 22;

FIGS. 24, 25 and 26 are diagrammaic views illustrating the action of the suspension parts when arranged as disclosed in FIGS. 22 and 23.

FIGS. 27–31 illustrate another embodiment:

FIG. 27 is a view similar to FIG. 3 but illustrating an alternative arrangement of the parallelogram linkage;

FIG. 28 is a view similar to FIG. 7 but showing the arrangement of FIG. 27;

FIG. 28a is a fragmentary view of certain parts shown in FIG. 28 but illustrating an alternative arrangement; and FIGS. 29, 30 and 31 are diagrammatic views illustrating the action of the suspension parts when arranged as disclosed in FIGS. 27 and 28.

DETAILED DESCRIPTION OF THE DRAWINGS

Figure 15:
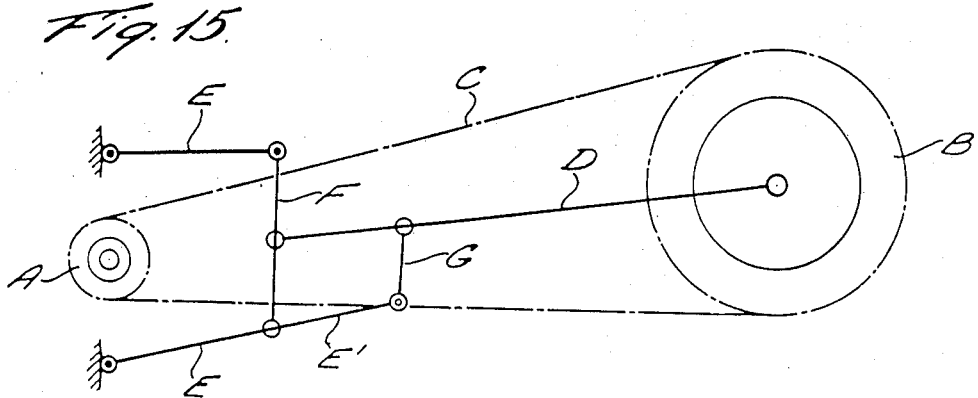
FIGS. 13 to 21 diagrammatically show alternative linkage and pivot locations.

The motorcycle illustrated in all of the drawings is typical of motorcycles employed for motocross racing; and while the invention is applicable to vehicles of a variety of types, the arrangement of the invention is particularly desirable for motorcycles, and especially for motorcycles used for motocross racing. The invention is, therefore, illustrated and described in relation to such specific use.

The motorcycle of all embodiments shown includes main frame components indicated at 8, 9, 10, 11 and 12.

The framing provides for support of an engine as indicated at 13, a rider's seat 14 and a fuel tank 15.

Other parts of the motorcycle of all embodiments include the following parts. Thus, the front wheel is indicated at 16 and the rear wheel at 17, these wheels being mounted on the frame structure, only portions of which are shown. The front wheel may be carried in any known manner, as by the fork 18 embodying shock absorbers 19 supported in a steering head 20 which is connected with the frame elements 8 and 10. The usual cycle steering handles 21 may be provided. The engine 13 and other equipment is positioned in the space defined by the frame elements 8, 9 and 10.

In the embodiment of FIGS. 1 to 7, the suspension system for the rear or driving wheel 17 includes a swing arm 22 of a type commonly employed on motorcycles and comprising a forked structure embracing the rear wheel 17, as is clearly shown in FIG. 6. Commonly, the swing arm has heretofore been pivotally mounted at some point on the frame structure, usually to the rear of the engine; but in accordance with the present invention, the swing arm is mounted in a novel manner fully described hereinafter.

The drive system for the rear wheel 17 includes a sprocket 23 mounted on the engine shaft and a sprocket 24 mounted on the wheel 17, with a drive chain 25 engaging the engine and wheel sprockets, as clearly appears in the drawings.

For the purpose of eliminating change in the length of the path of the drive chain 25, it is desirable that the motion of the swing arm 22 occur about the center 26 of the engine sprocket 23. However, the direct pivotal mounting of the swing arm 22 on the shaft or axis 26 is not always practical because of interference with other parts and the undesired complexity of having the swing arm connected with the engine drive shaft, thereby complicating separate mounting and removal of the engine and of other parts.

With the foregoing in mind, in all embodiments, the invention provides a suspension system which achieves the objective of providing for pivotal motion of the swing arm 22 about or substantially about the axis of the engine or drive sprocket shaft 26; and in most of the embodiments this is accomplished without the employment of direct pivotal mounting of the swing arm on the axis 26. In accordance with most of the embodiments of the invention, a suspension linkage system is provided having an effective pivotal axis for the swing arm which is either coincident with or close to the axis of the sprocket 23, which latter is also customarily coincident with the engine shaft. In such embodiments, the commonly used chain slack take-up device may be eliminated. However, various of the linkage arrangements herein disclosed achieve reduction in undesirable forces, even where the swing arm motion is not coincident with the axis of the driving sprocket, as brought out more fully hereinafter.

In the first embodiment, as shown in FIGS. 1 to 7, the structure provided includes a pair of levers 27 and 28 which are pivotally mounted on axes 29 and 30, carried by mounting brackets secured to the motorcycle framing, one offset above and the other offset below the sprocket shaft 26. These two levers lie in vertical planes laterally offset from each other and extend in a direction toward the drive wheel 17. The free ends of these levers are interconnected by a linkage system including a shaft 31, having at one end, an upwardly extended link arm 32, and at the other end, a downwardly extended link arm 33.

The swing arm 22 is mounted on the shaft 31; and the lower pivoted arm 28 has an extension 28a with which a link 34 is pivoted, the link 34 being extended upwardly for pivotal attachment to the swing arm 22 at the pivot point 35.

The link parts 31, 33, 28a, 34, and the swing arm 22 itself, constitute a parallelogram linkage which, because of its suspension by means of arms 27 and 28, provides an effective axis of swing motion for the swing arm 22, which axis is coincident with the sprocket shaft 26. It will be noted that this parallelogram linkage, providing the desired center of swing motion for the swing arm and thus for the drive wheel 17, is arranged in a manner to concentrate the parts close to the effective swing motion axis for the swing arm, thereby minimizing inertia effects on the deflection of the wheel itself.

It is also preferred in accordance with various embodiments of the present invention that the shock absorber mechanism, preferably including both a spring and hydraulic damper, be arranged to react on the linkage, such as above described, rather than at an outboard point on the swing arm itself. Thus, the mechanism for yieldably resisting upward deflection of the drive wheel includes a shock absorber mechanism comprising a spring and hydraulic damper unit generally indicated at 36, this unit or assembly being compressible between the end abutment elements 37 and 38. In the embodiment shown, the lower terminal element 37 extends downwardly through an aperture 22a in the swing arm 22 and is pivotally connected at 28b with the arm extension 28a; and the upper terminal element 38 is pivotally connected with one arm 39 of a bellcrank pivoted on the frame of the motorcycle at 40 and having another arm 41 pivotally connected by means of link 42 with the pivot axis 43 which serves also to interconnect the linkage parts 27 and 32.

For reasons more fully explained in my copending application Ser. No. 351,630 above fully identified, the linkage associated with the shock strut, including the bellcrank having arms 39 and 41, is arranged so that in the static or normal load position, as represented by FIG. 2, the axis of the link 42 is positioned to react in the tangent position in relation to the motion of the arm 41 about the bellcrank pivot 40, as is indicated by the dot and dash lines applied to FIG. 2. Similarly, in the position of maximum deflection, the axis of the shock absorber 3 is positioned to react at the joint of tangency of the connection point between the shock absorber and the arm 39 of the bellcrank, as is indicated by dot and dash axis lines as applied to FIG. 4. For reasons fully brought out in my copending applications above identified, these relationships provide a desirable progressive increase in the resistance to deflection of the wheel as the deflection progresses from the static or normal load position represented by FIG. 2 to the maximum load position represented by FIG. 4.

The arrangement of the linkage for the swing arm and for the shock resisting mechanism not only minimizes the inertia effects of these parts in relation to the motion or deflection of the driving wheel, but still further, the disposition of these various parts is important from the standpoint of concentrating those parts close to the center of gravity of the motorcycle as a whole. Moreover, the geometry of the parts as described has special advantages in minimizing tendency for the deflection resisting forces to induce or contribute to undesirable motions of the motorcycle about its overall center of gravity.

The arrangement of the present invention is characterized by the fact that the driving wheel is, in effect, more isolated from the remainder of the motorcycle, particularly with regard to the motions of the drive wheel and the dynamic and inertia forces involved in such motions and also in the action of the shock absorber or other motion-resisting mechanism.

Still further, the linkage parts involved in the arrangement of the present invention may be accommodated in a smaller lateral or transverse space than is the case with certain other suspension mechanisms of the prior art. Because of this, notwithstanding the fact that the linkage provides a parallelogram effect causing the motion of the drive wheel to occur about the axis of the driving sprocket, the relatively small overall lateral dimension of the parts provides ground clearance at the two sides of the motorcycle even when making sharp turns, which ground clearance is greater than in many prior suspension arrangements. Because of this increased lateral ground clearance, various parts, especially the suspension parts, may be mounted in lower positions, with consequent lowering of the overall center of gravity of the motorcycle; and this is of advantage for reasons well understood in this art.

Turning now to the alternative structural embodiments shown respectively in FIGS. 8, 9 and 10, in FIGS. 11 and 12, and in FIGS. 22 and 23, it is first noted that these alternative embodiments also have the advantages above referred to; but in addition, the alternative embodiments have further or collateral advantages, as will be pointed out following the detailed description of each one of the alternative arrangements.

In all of the alternative arrangements, many of the reference numerals applied are the same as those used in the description of the first embodiment contained in FIGS. 1 to 7; and in general, the modified or additional parts of the alternative embodiments are identified by similar reference numerals incorporating prime markings or letters, as will be pointed out.

Consider first the alternative embodiment of FIGS. 8 to 10 inclusive. The general distinction between this embodiment and the first embodiment lies in the fact that certain of the linkage components have been multiplied or duplicated, as compared with the first embodiment. Thus, note, for example, that in FIG. 7 of the first embodiment, a pair of levers 27 and 28 are provided, one being located at each side of the vertical plane of the drive wheel. Similarly, a pair of arms 32 and 33 associated with said levers 27 and 28 are provided one being located at each side of the vertical plane of the drive wheel. Comparison of FIG. 10 of the second embodiment with FIG. 7 of the first embodiment will immediately disclose that these levers and arms have been duplicated. Thus, as shown in FIG. 10, a pair of levers 27 and 27' are located at one side of the vertical plane of the drive wheel and another pair of levers 28 and 28' are located at the other side of that vertical plane. Similarly, a pair of arms 32 and 32', cooperating with the levers 27 and 27', are provided at one side and a pair of arms 33 and 33', cooperating with the levers 28 and 28', are provided at the other side. These parts will also be found in FIGS. 8 and 9. The arms 32 and 32' at one side, and the arms 33 and 33' at the other side, are rigidly connected with each other in pairs in order to provide the desired parallelogram linkage arrangement.

By virtue of this duplication, the mechanism can withstand very much greater wheel suspension forces, so that this arrangement can effectively be used in motorcycles of considerably larger size and weight. The arrangement of FIGS. 8 to 10 also has the advantage that the various forces are more uniformly distributed between various parts of the suspension mechanism and also between the suspension mechanism and the frame of the motorcycle.

As will be seen from FIGS. 8, 9 and 10, the pairs of levers 27 and 27' and 28 and 28' are pivoted about axes 29 and 29' and 30 and 30', the pivots 29 and 30' being coaxial and located above, and the pivots 29' and 30 being coaxial and located below the driving sprocket axis 26, and thereby providing the desired motion of the swing arm about the axis of the sprocket, as in the first embodiment. Since the pivots 29 and 29' and 30 and 30' are located in an upright plane containing the axis of the driving sprocket, the desired parallelogram action of the suspension inkage is provided.

Turning now to the embodiment shown in FIGS. 11 and 12, it is again noted that numerous reference characters employed in the description of the first embodiment, and some of which also are described in connection with the second embodiment, are used in the same manner as in FIGS. 11 and 12; and it is not believed that duplicate description of these parts is needed.

Stated briefly and generally, the embodiment of FIGS. 11 and 12 differs from the embodiment of FIGS. 1 to 7 in two important respects. First, the arrangement of FIGS. 11 and 12 includes multiple levers and arms, as in the embodiment of FIGS. 8 to 10; and in addition, in the embodiment of FIGS. 11 and 12, as distinguished from both the first embodiment and also the second embodiment, the principal levers of the parallelogram linkage are pivotally mounted on axes on the frame of the motorcycle, which axes are all located below the axis 26 of the driving sprocket 23. In the embodiment of FIGS. 8 to 10, and in the first embodiment, these principal levers of the parallelogram linkage are arranged so that pivot axes are provided both above and below the axis of the sprocket.

More specifically, in FIGS. 11 and 12, it will be noted that at one side of the mechanism, the principal levers 27' and 27" have pivot axes 29' and 29" both of which are spaced below the axis 26 of the sprocket 23 (but preferably lie in a common vertical generally upright plane with the axis 26 of the sprocket 23). Similarly, at the other side of the mechanism, the principal levers 28 and 28" are provided with axes 30 and 30" which are also both spaced below the axis 26 of the sprocket 23 but lie in the same plane as the pivot axes of the levers at the other side.

In the embodiment of FIGS. 11 and 12, the arms which interconnect the parallel levers, i.e., the arms indicated at 32" and 33", each comprise a rigid arm structure to which the levers 27' and 27" at one side are pivotally connected, and to which the arms 28' and 28" at the other side are pivotally connected. These arms 32" and 33" extend above the upper levers 27" and 28" to provide for support of the crosstie 31 on which the swing arm 22 is pivoted, as in the other embodiments. As seen in FIG. 11, the link 34 between the extension 28a of the arm 28 and the swing arm provides, in combination with the inner portion of the swing arm, the arms 32" and 33", and the arm 28a, a second parallelogram linkage which as described above in connection with the first embodiment provides the desired motion of the swing arm 22 about the axis 26 of the driving sprocket 23.

From the above, it will be seen that the same type of parallelogram linkages and motions are provided by the embodiment in FIGS. 11 and 12; and this affords various of the advantages described above in connection with FIGS. 1 to 7.

It will also be understood that the same type of shock absorber mechanism indicated at 36 may be employed in either the second or third embodiments, in the same general manner as in the first embodiment. This mechanism receives the motion of the swing arm through the connection 42 in the embodiments illustrated in FIGS. 8 to 10 and 11 and 12, in the same general manner as described above with reference to FIGS. 1 to 7.

In considering the embodiment of FIGS. 11 and 12, it is particularly to be noted that the fixed pivots for the principal levers 27' and 27" and 28 and 28" are both positioned in spaced relation below the axis 26 of the driving sprocket 23; and this is of advantage in maintaining the overall center of gravity of the wheel suspension linkage at a location as low as possible. However, from the standpoint of the action of the linkage, it would also be possible to mount the principal levers 27' and 27" and the levers 28 and 28" on pivots all located above the axis of the sprocket. In some cycle constructions, this would provide increased clearance for connection and interconnection of the parts, but it is preferred to locate the parallel links below the sprocket a in FIGS. 11 and 12.

In the preferred construction of any of the above described arrangements, it is contemplated that the principal parallel levers at both sides are preferably mounted on pivots which lie in or at least close to the same upright plane as the axis 26 of the driving sprocket; and for most installations, this coplanar arrangement is preferred whether both of the lever pivots at each side are located either above or below the axis of the driving sprocket, and also in arrangements (such as in FIGS. 1 to 7) in which one lever pivot is located above the sprocket and the other lever pivot below the sprocket.

FIGS. 13 to 21 diagrammatically illustrate several variants with respect to locations of lever and link pivots. From various of these figures, it will be seen that geometric variations from precise parallelograms may be used. In some instances, substantially equal and opposite inclination of the levers may be adopted while still retaining linkage motion approximating the action of a true parallelogram. Thus, the need for a slack take-up device for the drive chain may be avoided, even if the linkage does not precisely correspond to a parallelogram. Moreover, in some installations, for instance where especially difficult clearance problems are encountered, it may even be preferred to depart from a pure parallelogram to an extent requiring use of a chain slack take-up device. In some cases, this may still provide a desirable improvement with respect to dynamic forces, such as decreased tendency for acceleration to induce "squat".

Figure 13:
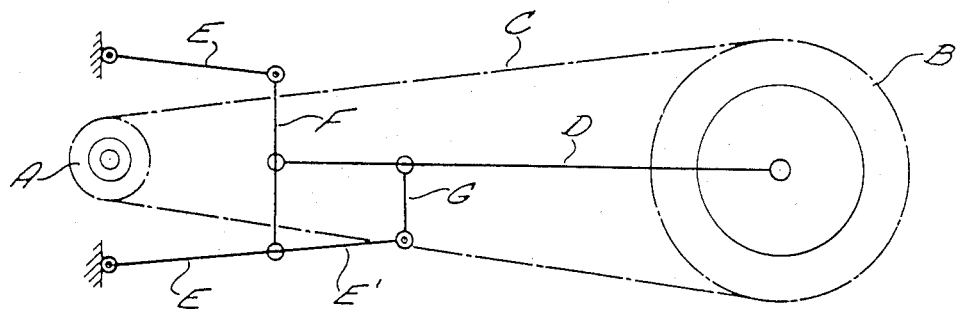

In considering the various diagrammatic illustrations of FIGS. 13 to 21, it is first noted that all of these diagrams have reference characters identifying the principal components which are involved in the motions of the suspension mechanism. Referring, for example, to FIG. 13, it will be seen that the motor or driving sprocket is diagrammatically indicated at A, and the wheel or driven sprocket is diagrammatically indicated at B. The interconnecting chain is indicated by the letter C.

The swing arm provided for the driving wheel is indicated by the letter D, and at its inner end, this swing arm is mounted by means of a pair of levers E—E which are mounted on fixed points as is indicated and which are pivotally interconnected by the link F, the swing arm D being pivotally mounted on the link F.

The lower lever E has an extension E rigid with the lower link E and extending in the direction of the wheel. This lever extension E¹ is pivotally connected with the swing arm D by means of the swing arm link G. The general structural relationship of these parts will readily be understood by comparison with any of the structural embodiments hereinabove fully described and illustrated in various of FIGS. 1 to 12.

Figure 14:
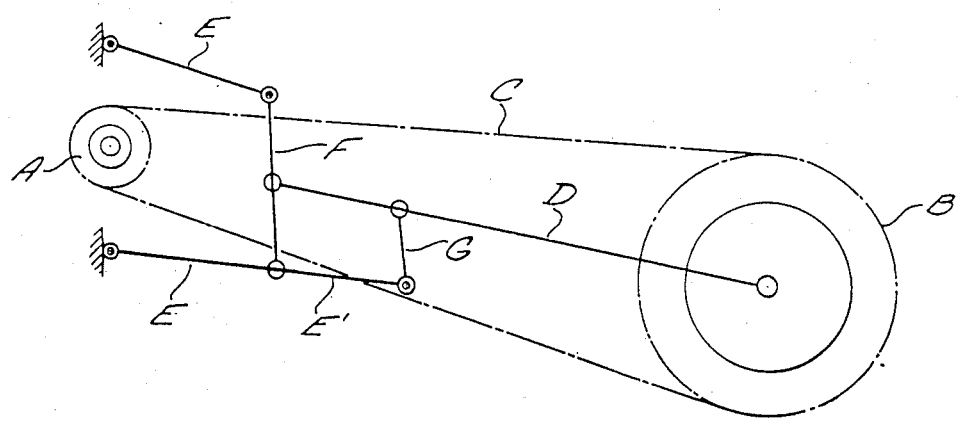

Referring now more specifically to the embodiment diagrammatically illustrated in FIGS. 13, 14 and 15, it is first noted that in this particular embodiment, the two levers E—E, instead of being substantially parallel to each other, diverge from each other to positions respectively above and below the driving sprocket A. With this "divergent" geometry, when the driven wheel is deflected downwardly, for instance, to a position such as indicated in FIG. 14, notwithstanding the divergent arrangement of the levers E, the swing arm D, and its pivotal connection with the link F, still remains substantially in alignment with the axes of the motor and wheel sprockets, in view of which the chain path is not appreciably changed. Therefore, a chain slack take-up device would not necessarily be needed. The same condition prevails upon upward deflection of the driving wheel, for instance, to the position indicated in FIG. 15. Although no substantial change in chain path length occurs, this arrangement actually does slightly alter the chain path length.

Figure 18:
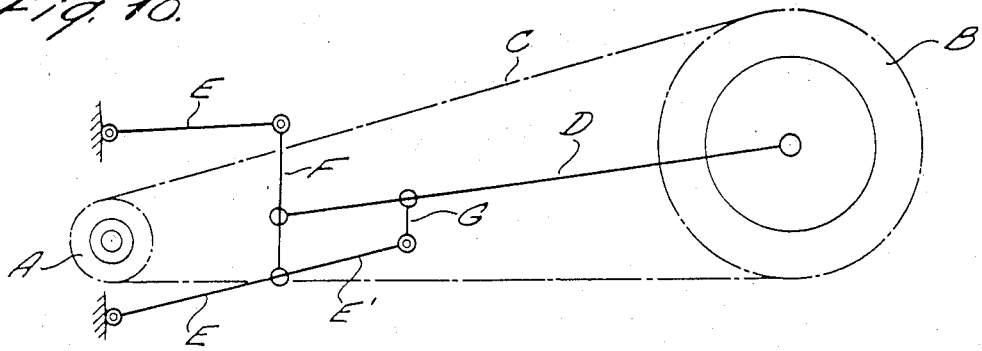
Figure 16:
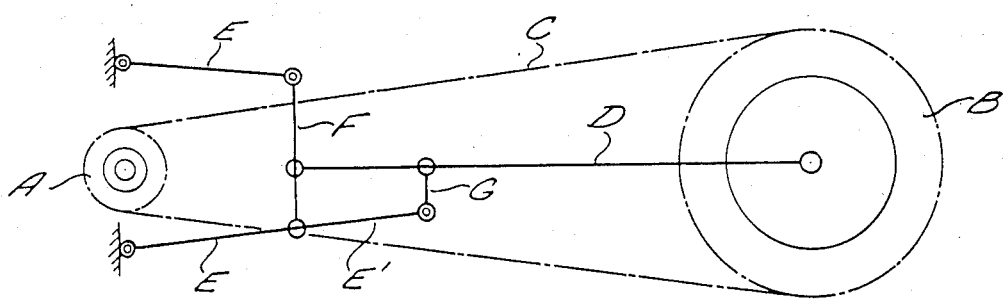
Figure 17:
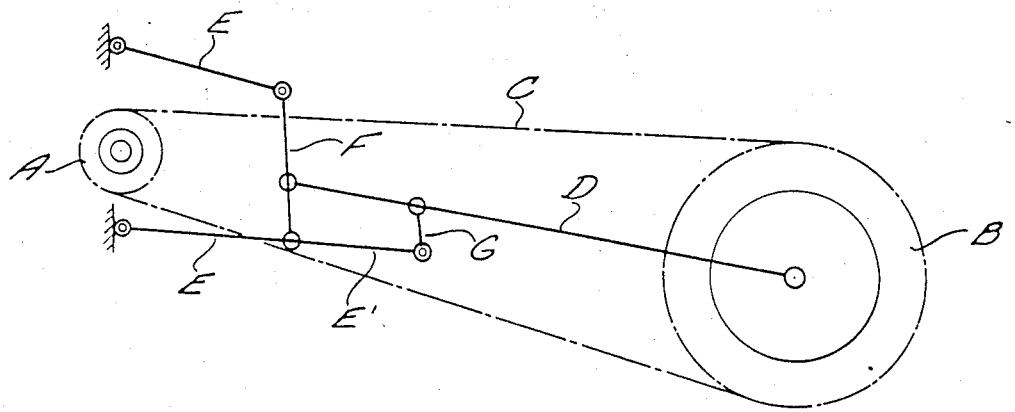

Turning now to the embodiment shown in FIGS. 16, 17 and 18, it is to be noted that the links and levers are again indicated by the same reference letters; but in this alternative embodiment, the levers E—E are positioned at different distances from the axis of the driving sprocket A. Both of the levers have been raised so that the upper lever E now lies in a position farther removed from the axis of the sprocket A than is the case with the lower lever E. When the parts are interconnected in the manner indicated in FIG. 16, with the swing arm D and its pivot located in a plane containing the axes of the driving and driven sprockets, downward deflection of the driven wheel to the position indicated in FIG. 17 still does not extensively alter the position of the swing arm and its pivot with respect to the plane containing the axes of the driving and driven sprockets.

From the above, it will be seen that in the embodiment of FIGS. 16, 17 and 18, deflection of the driven wheel does not extensively alter the chain length.

Figure 21:
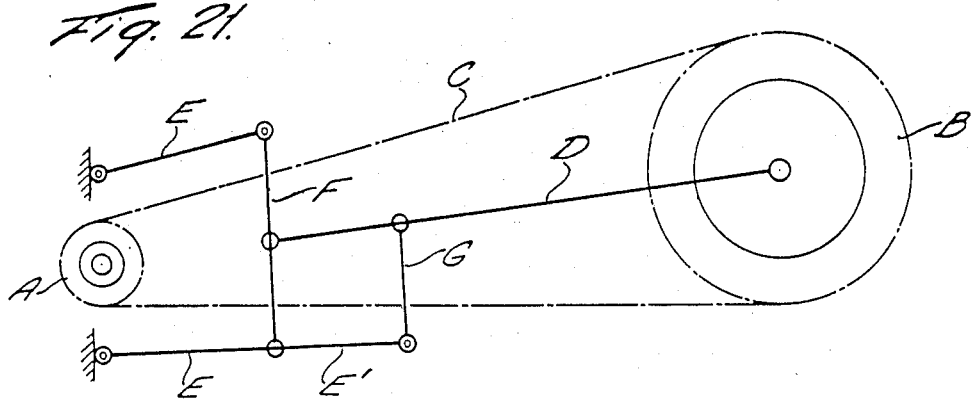
Figure 19:
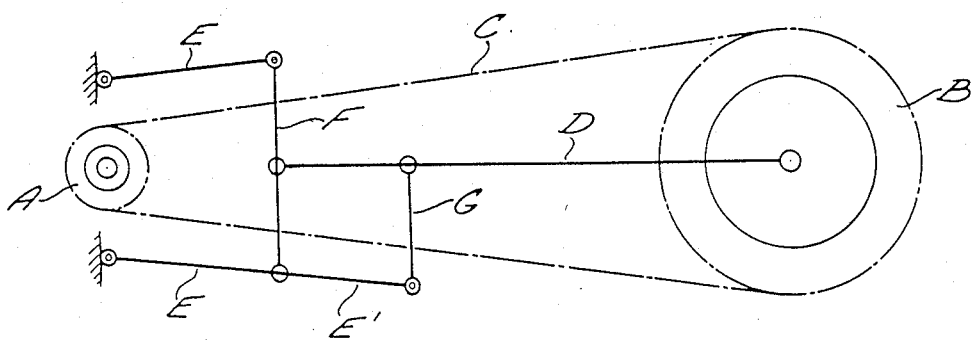
Figure 20:
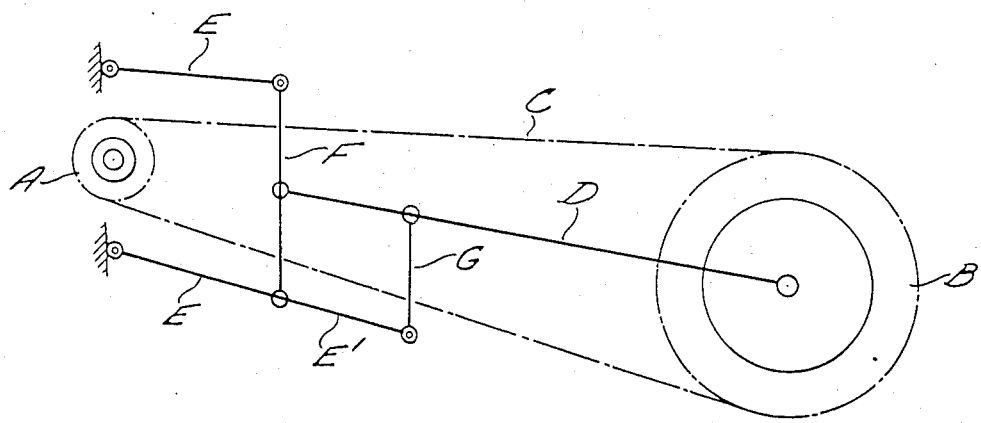

Similar results are achieved when employing an arrangement, suoh as shown in FIGS. 19, 20 and 21, in which the levers E—E converge rather than diverge from each other. Here again, deflection of the driven wheel does not appreciably change the position of the swing arm and its pivot with respect to the plane containing the axes of the driving and driven sprockets A and B.

It will be understood that in any of these arrangements where the length of the path of the chain between the driving and driven sprockets remains substantially the same in different positions of the driven wheel, the employment of a slack take-up device is not necessary.

In all embodiments disclosed, the tendency for the rear end of the motorcycle frame to deflect downwardly ("squat") in acceleration, is greatly reduced as compared with prior art suspensions, and this reduction is effected with the primary levers of the linkage either parallel, or diverging or converging.

From the foregoing, it will be seen that great flexibility is provided by the arrangements of the present invention with respect to selection of points on the framing of the motorcycle on which to mount the pivots for the primary supporting levers in the various embodiments disclosed.

Although certain forces, such as "squat" forces occurring during acceleration, may vary somewhat depending upon the specific lever and pivot arrangement employed, nevertheless, forces of this type are greatly reduced in all embodiments herein disclosed, as compared with various prior art suspension mechanisms.

The improvement with respect to reduction of "squat" is particularly significant in the embodiment described here below and illustrated in FIGS. 22-26 inclusive. The general arrangement of these figures is very close to the arrangement of the first embodiment, shown in FIGS. 1-7 inclusive. Most of the reference numbers used in the description of FIGS. 1-7 are equally applicable to FIGS. 22-26, and most of those reference numbers have actually been applied to FIGS. 22b26.

The chief differences between the structure of FIGS. 1-7 on the one hand and the structure of FIGS. 22-26 on the other hand is the positioning of the swing arm link which interconnects the swing arm 22 with the inboard portions of the suspension linkage. In FIGS. 22-26 this swing arm link is identified by the reference number 34a and examination of the figures will show that the swing arm link 34a has a pivotal connection 35a with the swing arm 22 and extends downwardly at an inwardly incline angle with its lower end pivoted to a portion of the suspension linkage. In the specific embodiment shown in FIGS. 22-26, the swing arm link 34a is pivotally connected at its lower end with the outward extension 28a of the lower arm or lever 28 of the inboard portion of the linkage.

From this it will be seen that the swing arm link 34a in the embodiment of FIGS. 22-26 is extended from the swing arm in a direction forming an oblique angle with respect to the generally upright link 32 and 33 of the inboard linkage parts. Specifically, the swing arm link 34a is extended in a direction forming an acute angle with respect to the generally upright link 32 of the inboard suspension coupling mechanism.

Figure 25:
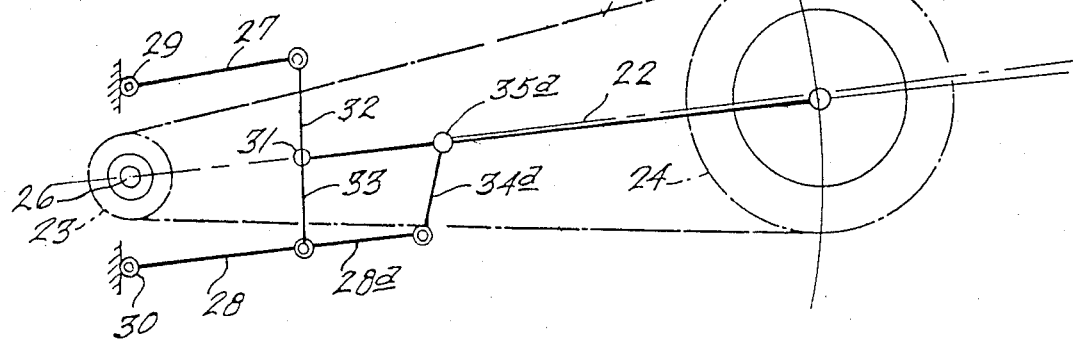
Figure 24:
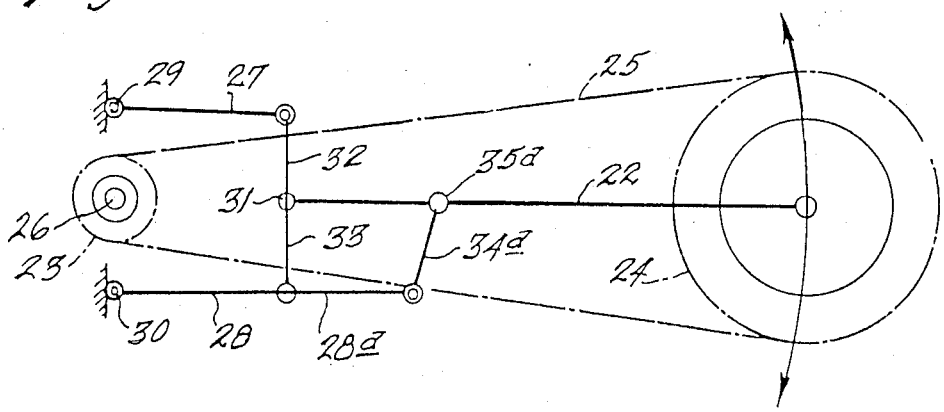
Figure 26:
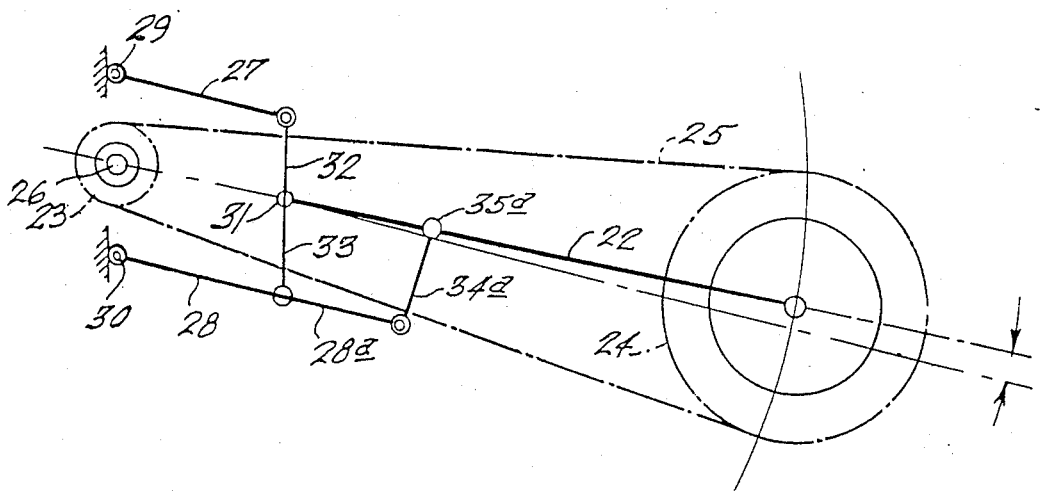

FIGS. 24, 25 and 26 diagramatically illustrate the geometric interrelationship of the major components of the system structurally shown in FIGS. 22 and 23, FIG. 24 showing the parts in the mid or partially deflected position of the suspension. FIG. 25 shows the relationship of the parts at the maximum upward deflected position; and FIG. 26 shows the relationship of the parts at the lowermost wheel position.

From FIGS. 24, 25 and 26 it will be observed that the angle of the swing arm link 34a with respect to the swing arm 22 changes with deflection, the angle on the inboard side being the smallest in the maximum upward deflected position shown in FIG. 25.

In consequence of the action of the parts when positioned as disclosed in this embodiment, there is a very considerable reduction in the tendency toward "squat", i.e. in the tendency for the rear end of the cycle to deflect downwardly in consequence of acceleration of the cycle. This is desirable for most motorcycles and is especially important in motorcycles used for motocross racing because of the extensive and repeated acceleration used in such racing.

Turning now to the alternative embodiment illustrated in FIGS. 27 to 31, it is first pointed out that certain portions of this arrangement are closely similar to the structure illustrated in the first embodiment which is shown in FIGS. 1 to 7 inclusive.

Briefly described, the arrangement of this embodiment as illustrated in FIGS. 27 to 31 incorporates all of those components of the suspension system of the first embodiment which are located below the plane of the swing arm. However, the desired linkage function in the embodiment of FIGS. 27 to 31 is provided by including the components of the suspension system below the swing arm in combination with a lever which extends forwardly of the swing arm and is pivotally mounted at one side of the motor on an axis substantially coincident with the axis of the driving sprocket.

With the foregoing general explanation in mind, attention is now directed to FIGS. 27 and 28 in which it will be seen that the swing arm 22 is provided at its forward end with a lever 22x which is integral with swing arm and which is mounted on a pivot axis 26x on the frame 9, this pivot axis being coincident with the axis of the drive sprocket 23.

At the other side of the structure, however, the swing arm does not extend inwardly to the region of the axis of the drive sprocket, but, instead, a lever 28x is provided, being pivoted on an axis 30x located below but in the same vertical plane as the axis of the drive sprocket 23. Moreover, as in the first embodiment, a transverse shaft 31x extends transversely of the suspension mechanism and is provided with a downwardly extended arm 33i x at the side of the suspension system opposite to the swing arm lever 22x. The lower end of the arm 33x is pivotally connected to the lever 28x. The swing arm 22, as in the first embodiment described above, is pivotally connected with the transverse shaft 31x.

The lever 28x is also provided with an extension 28y below the swing arm and toward the side of the swing arm on which the lever extension 22x is provided. This lever extension 28y is connected with the swing arm, by means of the swing arm link 34x, thereby providing a parallelogram arrangement.

As in the first embodiment, the damper unit 36 extends between the arm 39 of the bell crank pivoted above the suspension linkage, the lower end of the damper unit, as in the embodiment of FIG. 1, being connected with the lever extension 28y by means of a pivot such as shown at 37. The other arm 41 of the bell crank which is pivoted at 40 is connected with the transverse shaft 31x by means of the link 42x.

The swing arm link 34x in the embodiment of FIG. 28 is arranged in the perpendicular manner illustrated in the embodiment of FIGS. 1 to 7, thereby providing the parallelogram action described in relation to the first embodiment.

Figure 31:
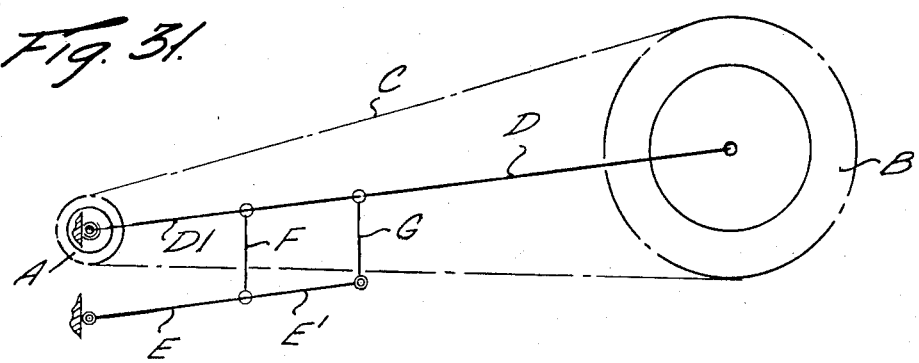
Figure 29:
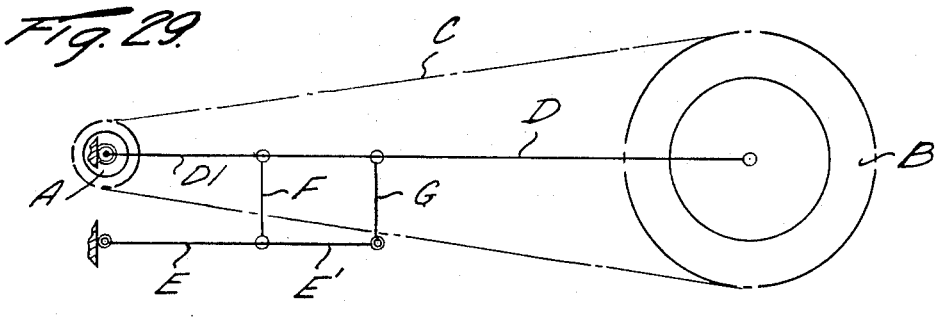
Figure 30:
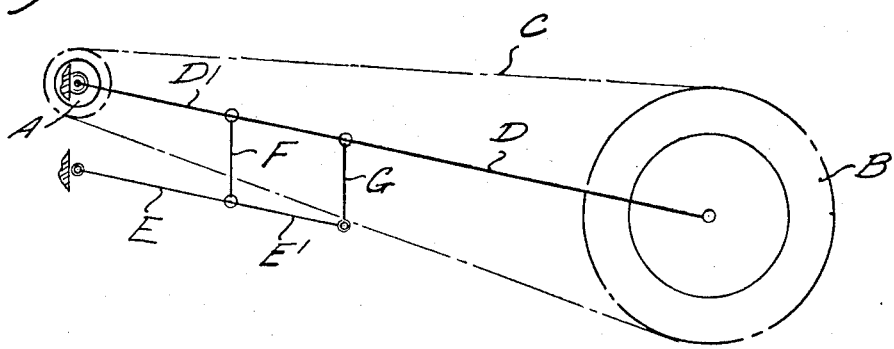

The arrangement of FIGS. 27 and 28 will provide for relative motions of the parts as indicated in the diagrams of FIGS. 29, 30 and 31. In these diagrams, the various components are identified by letters in the general manner of FIGS. 13 to 15 described above, but the linkage shown in FIGS. 29 to 31 includes the inwardly extended swing arm lever D1 which is mounted for pivotal motion about the axis of the driving sprocket A, An arrangement similar to that shown in FIG. 28 appears in FIG. 28a in which most of the parts are identical with FIGS. 27 and 28, but in which provision is made for employment of a swing arm link interconnecting the lever extension 28y and the swing arm, with this link extended at an oblique angle to the plane of the transverse shaft 31x and the arm 33x. The effect of this obliquity is described above in connection with the embodiment of FIGS. 22 to 26.

Because of the slight deviation from the parallelogram configuration of the linkage, the lever which is identified in FIG. 28a as 22x' is not integrally connected with the swing arm, but is pivotally connected with the swing arm about the axis of the transverse shaft 31x.

From the above, it will be seen that the configurations of FIGS. 27 to 31 provide the desired type of functioning of the linkage even where one of the lever components is pivoted coaxially with the driving sprocket at one side, the other lever component being pivotally mounted at the other side of the structure on an axis vertically offset from the axis of the driving sprocket. This may be accomplished either by employing a pure parallelogram linkage as shown in FIGS. 27 and 28, or by employing a linkage having slight deviation from the parallelogram configuration (because of the obliquity of the swing arm link 34x' shown in FIG. 28 28a) and thereby achieve the special "squat" reduction discussed above in connection with FIGS. 22 to 26. These arrangements thus provide for simplification of the suspension system while, at the same time, eliminating the need for a slack take-up device for the driving chain. Moreover, since the inwardly extended swing arm lever is pivoted coaxially of the driving sprocket at only one side of the motorcycle, convenient access to the engine at the other side is retained.

I claim:

1. In a power driven vehicle having a frame, a drive wheel, a motor, and wheel drive mechanism including a motor sprocket, a wheel sprocket, and a drive chain connecting the sprockets, a drive wheel suspension system comprising a swing arm for the drive wheel extended forwardly of the wheel sprocket, a first lever projecting forwardly of the swing arm in a plane at one side of the motor and pivotally mounted on an axis substantially coincident with the driving sprocket, a second lever positioned in a plane at the other side of the motor and pivotally mounted on a axis spaced below the driving sprocket and extended rearwardly of the driving sprocket, linkage pivotally interconnecting the first and said second levers in a generally upright transverse plane between the motor and wheel sprockets, the swing arm being pivotally connected with said linkage, said second lever having a portion extended rearwardly beyond said linkage to a position below the swing arm, a swing arm link extended between the swing arm and said second lever extension and pivotally interconnecting the swing arm and said second lever extension, and means connected with the wheel suspension system for resisting drive wheel deflection.

2. In a power driven vehicle having a frame, a drive wheel, a motor, and wheel drive mechanism including a motor sprocket, a wheel sprocket, and a drive chain connecting the sprockets, a drive wheel suspension system comprising a swing arm for the drive wheel extended forwardly of the wheel sprocket, a first lever projecting forwardly of the swing arm in a plane at one side of the motor and pivotally mounted on an axis substantially coincident with the driving sprocket, a second lever positioned in a plane at the other side of the motor and pivotally mounted on an axis vertically spaced from the axis of the driving sprocket and extended rearwardly of the driving sprocket, linkage pivotally interconnecting the first and said second levers in a generally upright transverse plane between the motor and wheel sprockets, the swing arm being pivotally connected with said linkage, said second lever having a portion extended rearwardly beyond said linkage to a position vertically spaced from the swing arm, a swing arm link extended between the swing arm and said second lever extension and pivotally interconnecting the swing arm and said second lever extension, and means connected with the wheel suspension system for resisting drive wheel deflection.

3. A construction as defined in claim 2 in which said first lever which projects forwardly of the swing arm is rigidly connected with the swing arm, and in which the swing arm link is parallel to said generally upright transverse plane between the motor and wheel sprockets.

4. A construction as defined in claim 2 in which said first lever which projects forwardly of the swing arm is pivotally connected with the swing arm and in which the swing arm link is obliquely inclined with respect to said generally upright transverse plane between the motor and wheel sprockets.

5. A construction as defined in claim 2 in which said first lever which projects forwardly of the swing arm is pivotally connected with the swing arm and in which the swing arm link is inclined upwardly and away from said generally upright transverse plane between the motor and wheel sprockets.

* * * * *

UNITED STATES PATENT AND TRADEMARK OFFICE
CERTIFICATE OF CORRECTION

PATENT NO. : 4,621,706

DATED : November 11, 1986

INVENTOR(S) : Eyvind Boyesen

It is certified that error appears in the above-identified patent and that said Letters Patent is hereby corrected as shown below:

Column 2, line 44 - "parts" should read --pivots--.

Column 5, line 49 - "3" should read --36--.

Column 5, line 49 - "joint" should read --point--.

Signed and Sealed this

Third Day of February, 1987

Attest:

DONALD J. QUIGG

Attesting Officer

Commissioner of Patents and Trademarks